United States Patent
Chen et al.

(10) Patent No.: US 11,698,489 B1
(45) Date of Patent: Jul. 11, 2023

(54) PHOTONIC PACKAGE DEVICE AND METHOD FOR FABRICATING THE SAME

(71) Applicant: TAIWAN SEMICONDUCTOR MANUFACTURING COMPANY, LTD., Hsinchu (TW)

(72) Inventors: Ying-Hua Chen, Hsinchu County (TW); Hau-Yan Lu, Hsinchu (TW); Wen-Chen Lu, Hsinchu County (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

(21) Appl. No.: 17/674,957

(22) Filed: Feb. 18, 2022

(51) Int. Cl.
*G02B 6/136* (2006.01)
*G02B 6/12* (2006.01)

(52) U.S. Cl.
CPC ......... *G02B 6/136* (2013.01); *G02B 6/12002* (2013.01); *G02B 2006/12121* (2013.01)

(58) Field of Classification Search
CPC ................ G02B 6/136; G02B 6/12002; G02B 2006/12121
See application file for complete search history.

(56) References Cited

U.S. PATENT DOCUMENTS

| 10,840,197 B2* | 11/2020 | Hsu | H01L 21/76885 |
| 11,347,001 B2* | 5/2022 | Chen | G02B 6/12002 |

* cited by examiner

*Primary Examiner* — John Bedtelyon
(74) *Attorney, Agent, or Firm* — Birch, Stewart, Kolasch & Birch, LLP

(57) ABSTRACT

A method for fabricating a photonic package device is provided. The method includes patterning a semiconductor layer of a semiconductor-on-insulator (SOI) substrate into a waveguide structure and at least one first semiconductor pillar; forming a metal-dielectric stack over the waveguide structure and the first semiconductor pillar; etching an opening in the metal-dielectric stack to expose the first semiconductor pillar; etching an insulator layer of the SOI substrate to form at least one insulator cap below the first semiconductor pillar; and etching a base semiconductor substrate of the SOI substrate to form at least one second semiconductor pillar below the insulator cap.

20 Claims, 16 Drawing Sheets

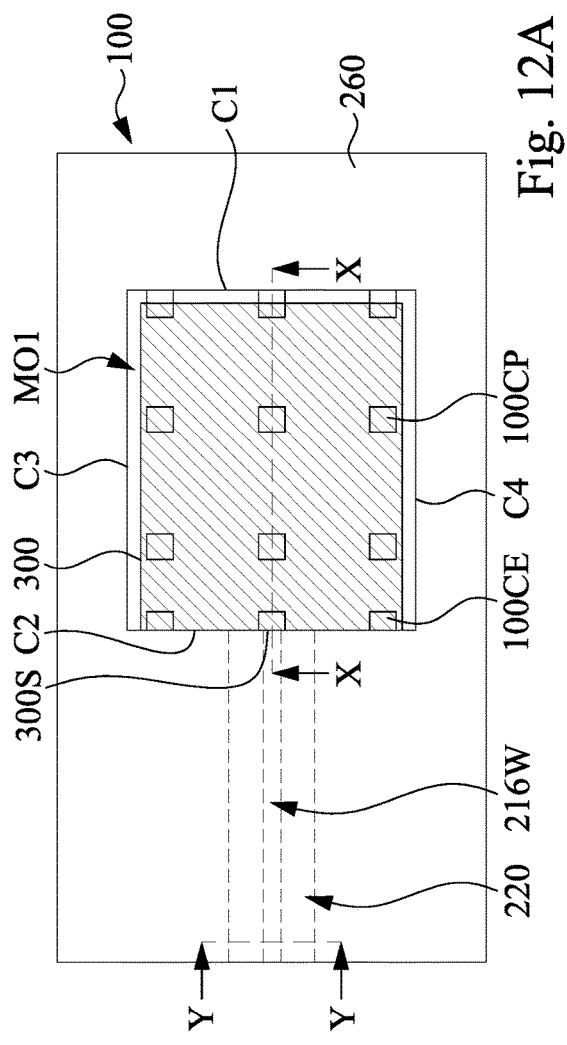
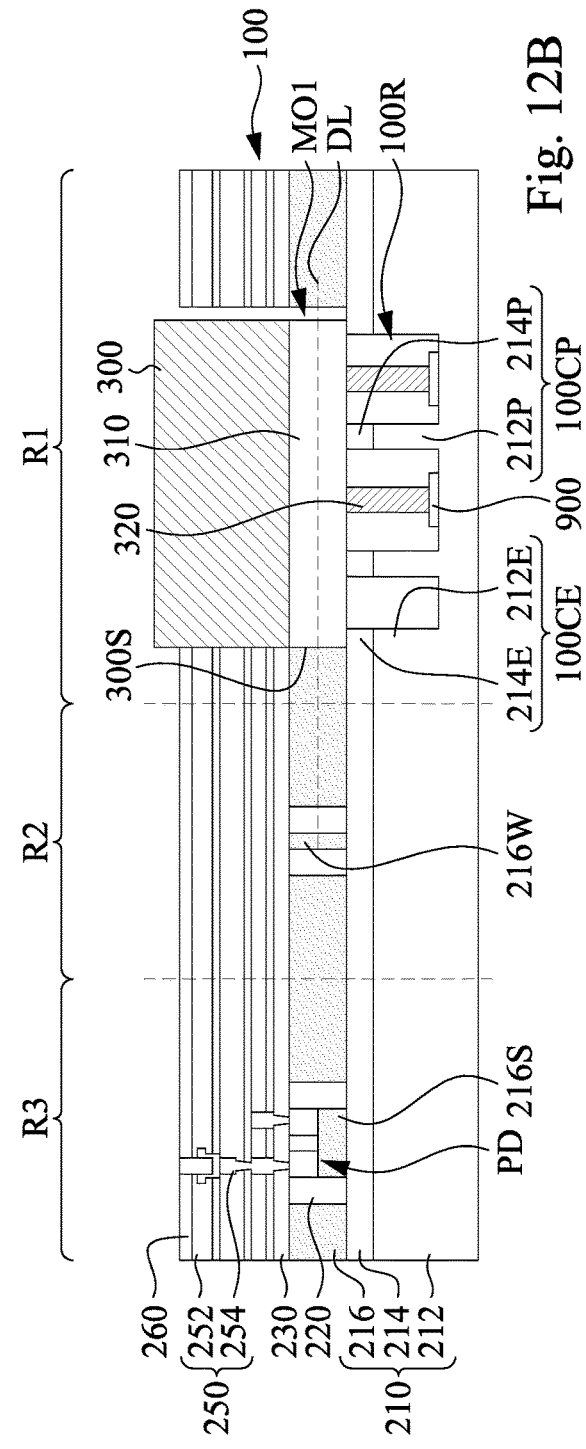

PHOTONIC PACKAGE DEVICE AND METHOD FOR FABRICATING THE SAME

BACKGROUND

Electrical signaling and processing have been the mainstream techniques for signal transmission and processing. Optical signaling and processing have been used in increasingly more applications in recent years, particularly due to the use of optical fiber-related applications for signal transmission.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 2-12B illustrate a method for fabricating a photonic package device at various intermediate stages of manufacture according to some embodiments of the present disclosure.

DETAILED DESCRIPTION

Figure 1:
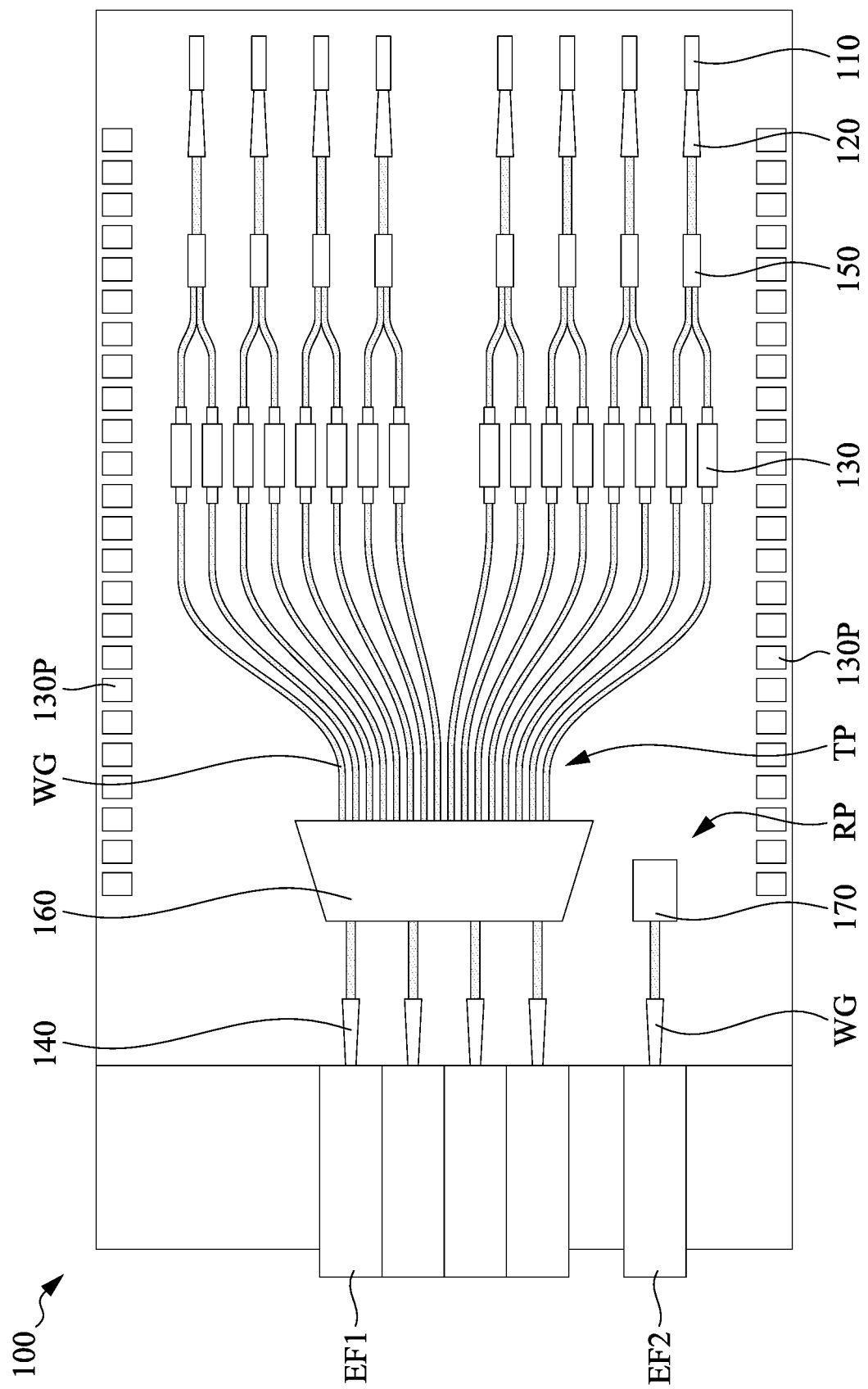
FIG. 1 is a schematic top view of a photonic package device according to some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

A photonic package device and the methods of forming the same are provided in accordance with some embodiments of the present disclosure. The intermediate stages of manufacturing the photonic package device are illustrated. Variations of the embodiments are also discussed. Throughout the various views and illustrative embodiments, like reference numbers are used to designate like elements.

FIG. 1 is a schematic top view of a photonic package device 100 according to some embodiments of the present disclosure. The photonic package device 100 may include optical sources 110, optical couplers 120, modulators 130, optical couplers 140, and waveguides WG. The optical sources 110 may be configured to provide unmodulated lights, such as unmodulated lasers. For example, the optical sources 120 may be laser diodes or other light sources. The optical couplers 120 may respectively receive the unmodulated lights from the optical sources 110 and direct the unmodulated lights into the waveguides WG, thereby sending the unmodulated lights toward the modulators 130. The modulators 130 may modulate and adjust characteristics (e.g., modes) of the unmodulated lights with modulation signals (i.e. the data) by applying voltages on pads 130P for modulators 130. After the modulation, waveguides WG send the modulated lights toward the optical couplers 120, thereby outputting the modulated lights from the optical couplers 140, for example, to external fibers 200. The optical sources 110, the optical couplers 120, the modulators 130, the optical couplers 140, and the waveguides WG may form a transmitter path TP. Additional component (e.g., splitters 150 and multiplexer 160) may be optically coupled between the optical couplers 120 and 140 through waveguides WG in the transmitter path TP. These components (e.g., the optical source 110, the optical coupler 120, the modulator 130, the optical coupler 140, the splitters 150, the multiplexer 160, and the waveguides WG) may be fabricated over a semiconductor substrate and covered by one or more layers (e.g., multi-level interconnect structure fabricated in a back-end-of-line (BEOL) process).

In some embodiments, the photonic package device 100 may be a fiber-optical transceiver including the transmitter path TP and a receiver path RP on a chip. The receiver path RP may include a photodetector 170. The photodetector 170 may convert light signals (e.g., from an external fiber EF2) into electrical signals, which can then be amplified and processed. In some alternative embodiments, the photonic package device 100 is a fiber-optical transmitter including a transmitter path TR on a chip, and the receiver path RP may be omitted from the chip. It should be noted that, the transmitter path TR and the receiver path RP in FIG. 1 are shown in a simplified manner. Additional components, such as amplifier or switches, may be present in the transmitter path TR and the receiver path RP.

FIGS. 2-10B illustrate a method for fabricating a photonic package device (e.g., the photonic package device 100 in FIG. 1) at various intermediate stages of manufacture according to various embodiments of the present disclosure. It is understood that additional operations may be provided before, during, and after the operations shown by FIGS. 2-10B, and some of the operations described below can be replaced or eliminated for additional embodiments of the method. The order of the operations/processes may be interchangeable.

Figure 2:
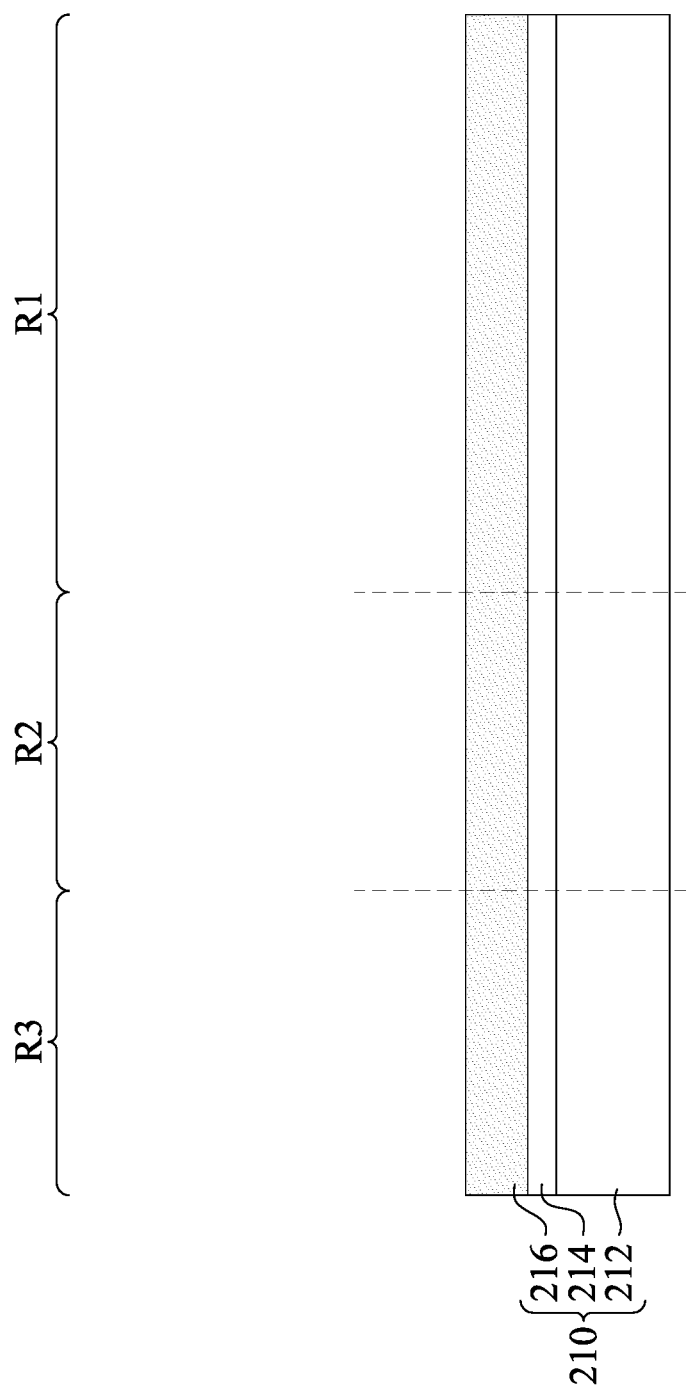

Reference is made to FIG. 2. A semiconductor substrate 210 is provided. The semiconductor substrate 210 may be a semiconductor-on-insulator (SOI) substrate including a base substrate 212, an insulator layer 214 over the base substrate 212, and a semiconductor layer 216 over the insulator layer 214. The base substrate 212 may be a bulk substrate, such as bulk silicon substrate. The base substrate 212 may include silicon. Alternatively, the base substrate 212 may include other elementary semiconductor such as germanium. The base substrate 212 may also include a compound semiconductor such as silicon carbide, gallium arsenic, indium arsenide, and indium phosphide. The base substrate 212 may include an alloy semiconductor such as silicon germanium, silicon germanium carbide, gallium arsenic phosphide, and gallium indium phosphide. The base substrate 212 may be referred to as a handle wafer in some embodiments. The insulator layer 214 may include silicon oxide or other suitable insulating materials, and/or combinations thereof. In some embodiments, an insulator layer 214 may include a buried oxide layer (BOX) that is grown or deposited overlying the silicon base substrate 212. The semiconductor layer 216 may include an elementary semiconductor, such as silicon (Si) or germanium (Ge) in a crystalline structure; a compound semiconductor, such as silicon germanium (SiGe), silicon carbide (SiC), gallium arsenic (GaAs), gallium phosphide (GaP), indium phosphide (InP), indium arsenide (InAs), and/or indium antimonide (InSb); or combinations thereof. For example, the SOI substrates are fabricated using separation by implantation of oxygen (SIMOX), wafer bonding, and/or other suitable methods. For clear illustration, in the cross-sectional views of some embodiments, the semiconductor substrate 210 is shown as having regions R1-R3 for accommodating various components, such as photodiodes, waveguides and edge couplers, and light sources devices.

Figure 3A:
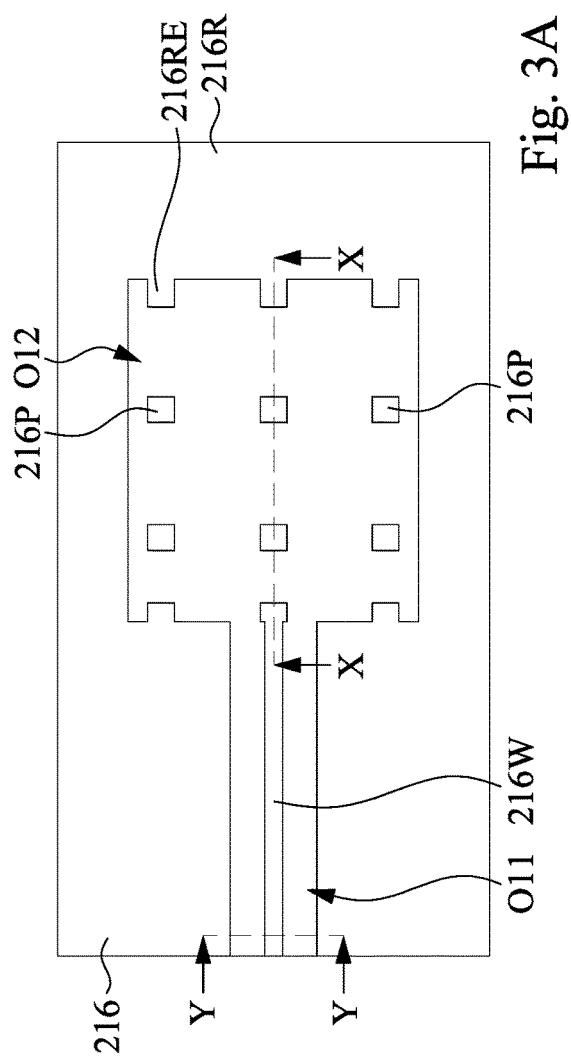
Figure 3B:
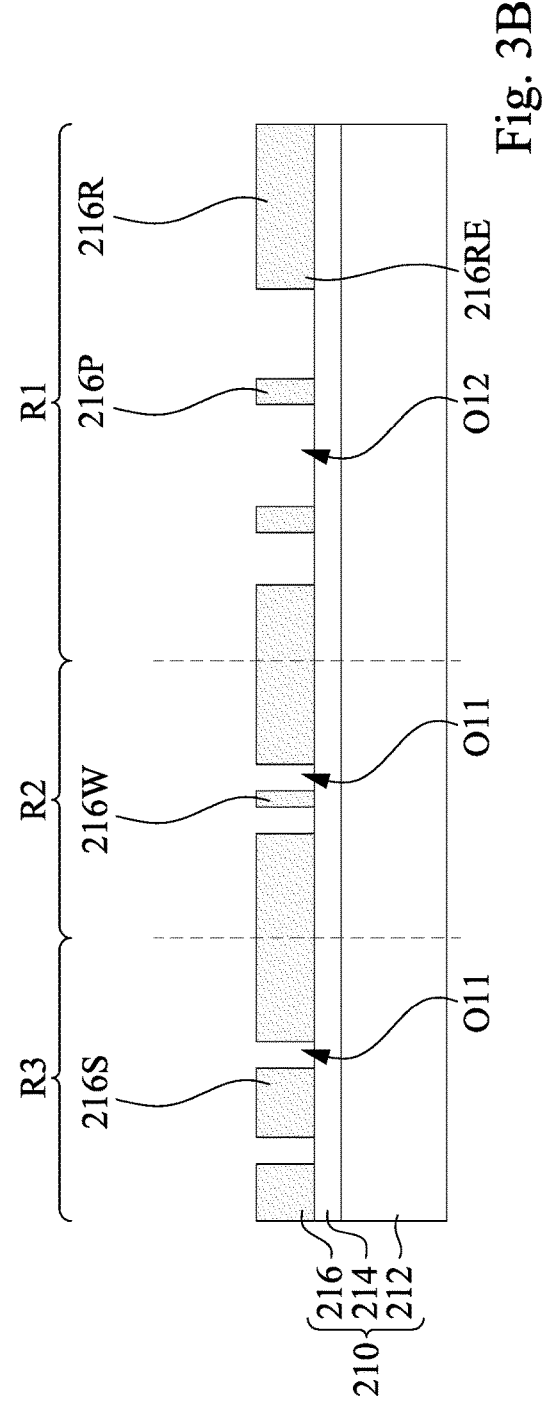

Reference is made to FIGS. 3A and 3B. FIG. 3A shows a schematic top view of the photonic package device. FIG. 3B is a schematic cross-sectional view of the photonic package device including a cross-sectional view taken along line X-X of FIG. 3A (corresponding to the region R1) and a cross-sectional view taken along Y-Y of FIG. 3A (corresponding to the region R2). The semiconductor layer 216 is patterned into semiconductor structures 216S, 216W, semiconductor pillars 216P, and a peripheral structure 216R by one or more etching process. The insulator layer 214 has a higher etch resistance to the etching process than that of the semiconductor layer 216, and thus may serve as an etch stop layer during the etching process. Through the etching process, openings O11 and O12 are etched through the semiconductor layer 216. The openings O11 and O12 may be surrounded by the peripheral structure 216R and spaces the peripheral structure 216R from the semiconductor structures 216S, 216W, and semiconductor pillars 216P. For example, in the regions R2 and R3, the openings O11 surround the semiconductor structures 216S and 216W, in which the semiconductor structure 216S is to form the photodetector 170 in FIG. 1, and the semiconductor structure 216W is to form the waveguides WG and the optical couplers 120 and 140 in FIG. 1. In the region R3, the opening O12 surrounds the semiconductor pillars 216P, which are to support the optical source 110 in FIG. 1. For providing the mechanical support, the semiconductor pillars 216P may have a width greater than that of the structures 216W to form the waveguides WG in FIG. 1. In some embodiments, the peripheral structure 216R may have edge portions 216RE adjacent the opening O12. In the present embodiments, the edge portions 216RE of the peripheral structure 216R are illustrated as wall pillars that protrudes from an edge of the opening O12 from the top view. For example, the edge portions 216RE may have similar confutation as that of the semiconductor pillars 216P. In some other embodiments, the edge portions 216RE of the peripheral structure 216R may have other suitable configuration.

In some embodiments, prior to the etching process, a photoresist mask (not shown) is formed over the structure of FIG. 2 and exposing parts of the semiconductor layer 216. The photoresist mask (not shown) may include a photosensitive material. The photoresist mask may be formed by suitable photolithography process, and have openings (or trenches) therein. The photolithography process may include coating a photoresist layer (not shown), exposing the photoresist to a pattern, performing post-exposure bake processes, and developing the resist to form a patterned mask including the resist. In some alternative embodiments, the photoresist mask may be a tri-layer photoresist. For example, the photoresist mask 190 includes a bottom layer, a middle layer over the bottom layer, and a photoresist layer over the middle layer. The bottom layer may include organic or inorganic material. The middle layer may include silicon nitride, silicon oxynitride, SiOC, or the like. The photoresist layer may include a photosensitive material. The semiconductor layer 216 is patterned into the semiconductor structures 216S, 216W, the semiconductor pillars 216P, and the peripheral structure 216R by the etching process using the photoresist mask as etch mask. After the etching process, the photoresist mask may be stripped off by suitable ashing process after the second selective etching process.

Figure 4:
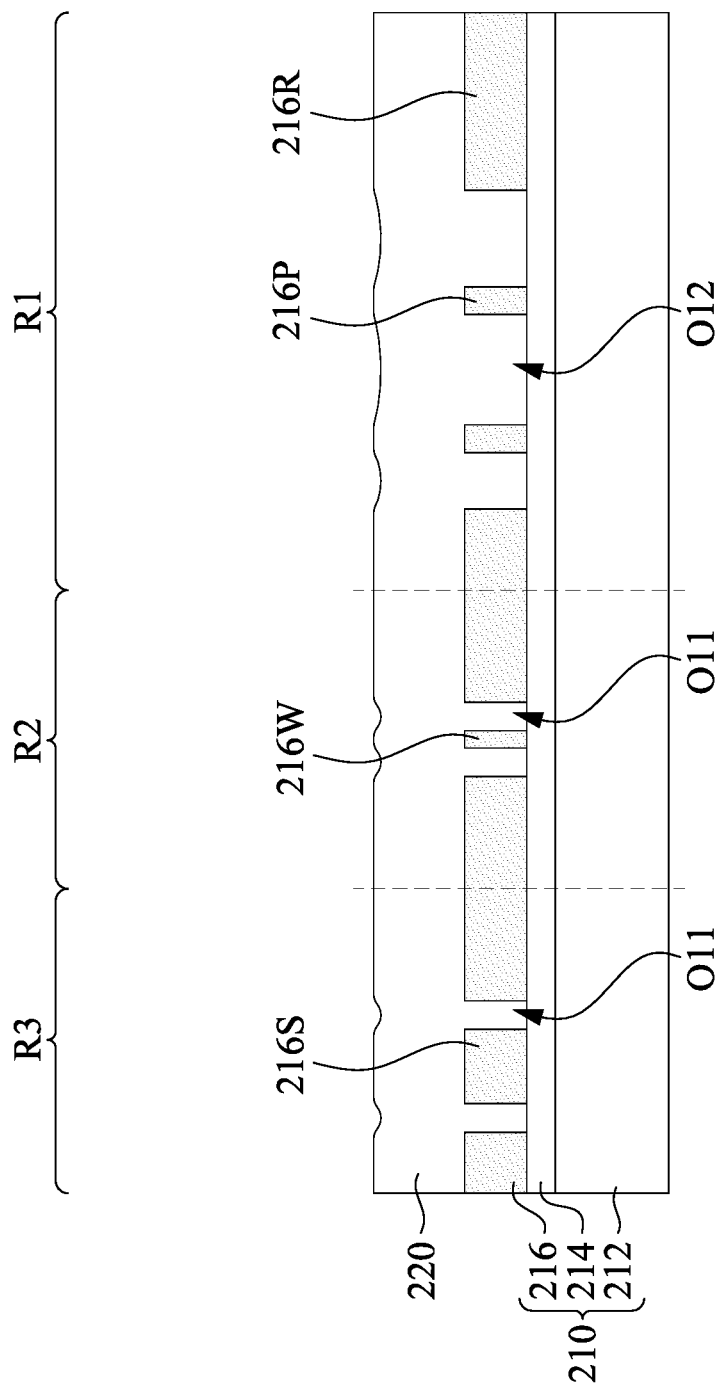

Reference is made to FIG. 4. A dielectric layer 220 is deposited to fill the openings O11 and O12. The dielectric layer 220 may surround and cover the semiconductor structures 216S, 216W, the peripheral structure 216R, and the semiconductor pillars 216P. In some embodiments, the dielectric layer 220 may include an oxide (e.g., $SiO_2$), an ultra-low k dielectric material, a low-k dielectric material (e.g., SiCO), SiON, or the like. In some embodiments, a refractive index of the material of the dielectric layer 220 is less a refractive index of the material of the semiconductor layer 216, thereby resulting in optical confinement in the structure 216W. In some embodiments, the dielectric layer 220 may be formed by chemical vapor deposition (CVD) process, flowable CVD process, atomic layer deposition (ALD), or other suitable process, or the combination thereof.

Figure 5:
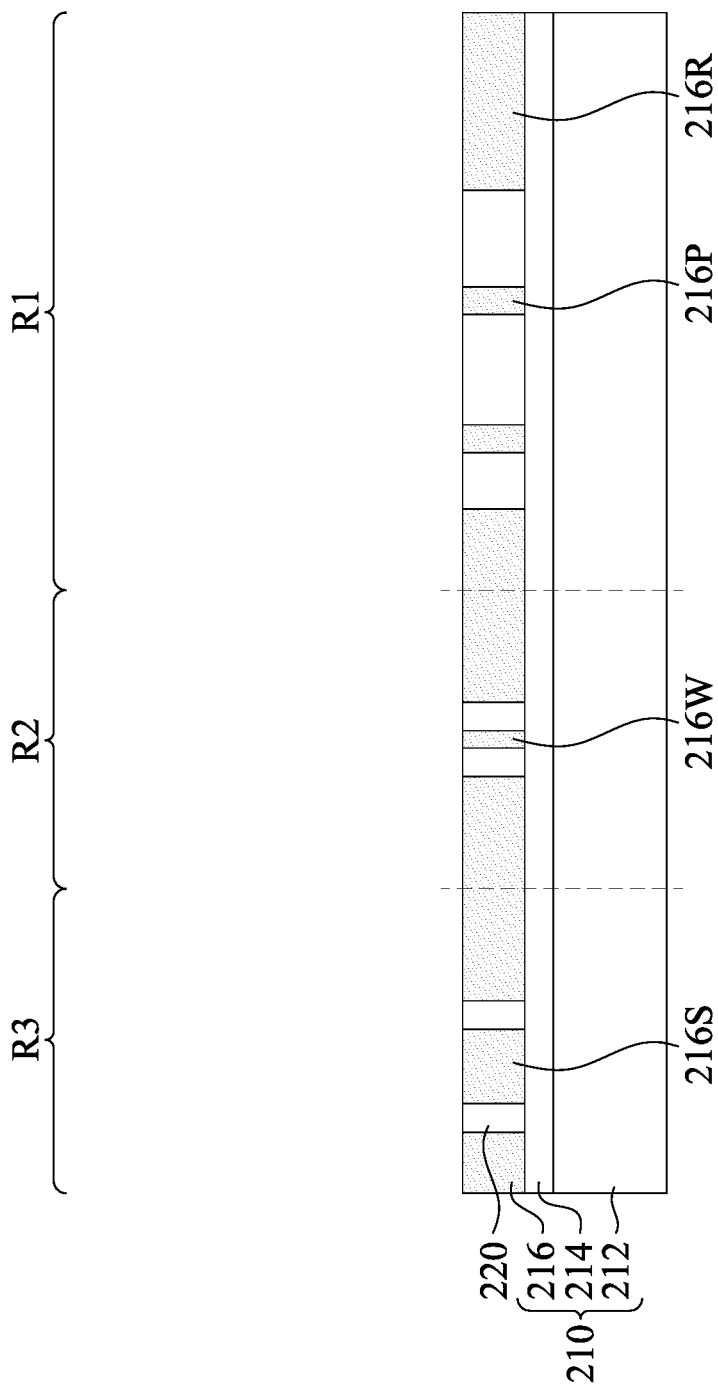

Reference is made to FIG. 5. A CMP process is performed to remove a portion of the dielectric layer 220 over the semiconductor layer 216, thereby exposing the semiconductor structures 216S, 216W, the peripheral structure 216R, and the semiconductor pillars 216P. After the CMP process, the structure may have a substantially flat top surface for receiving materials thereon, thereby improving film uniformity. For example, top surfaces of the semiconductor structures 216S, 216W, the peripheral structure 216R, and the semiconductor pillars 216P may substantially at the same level.

Figure 6:
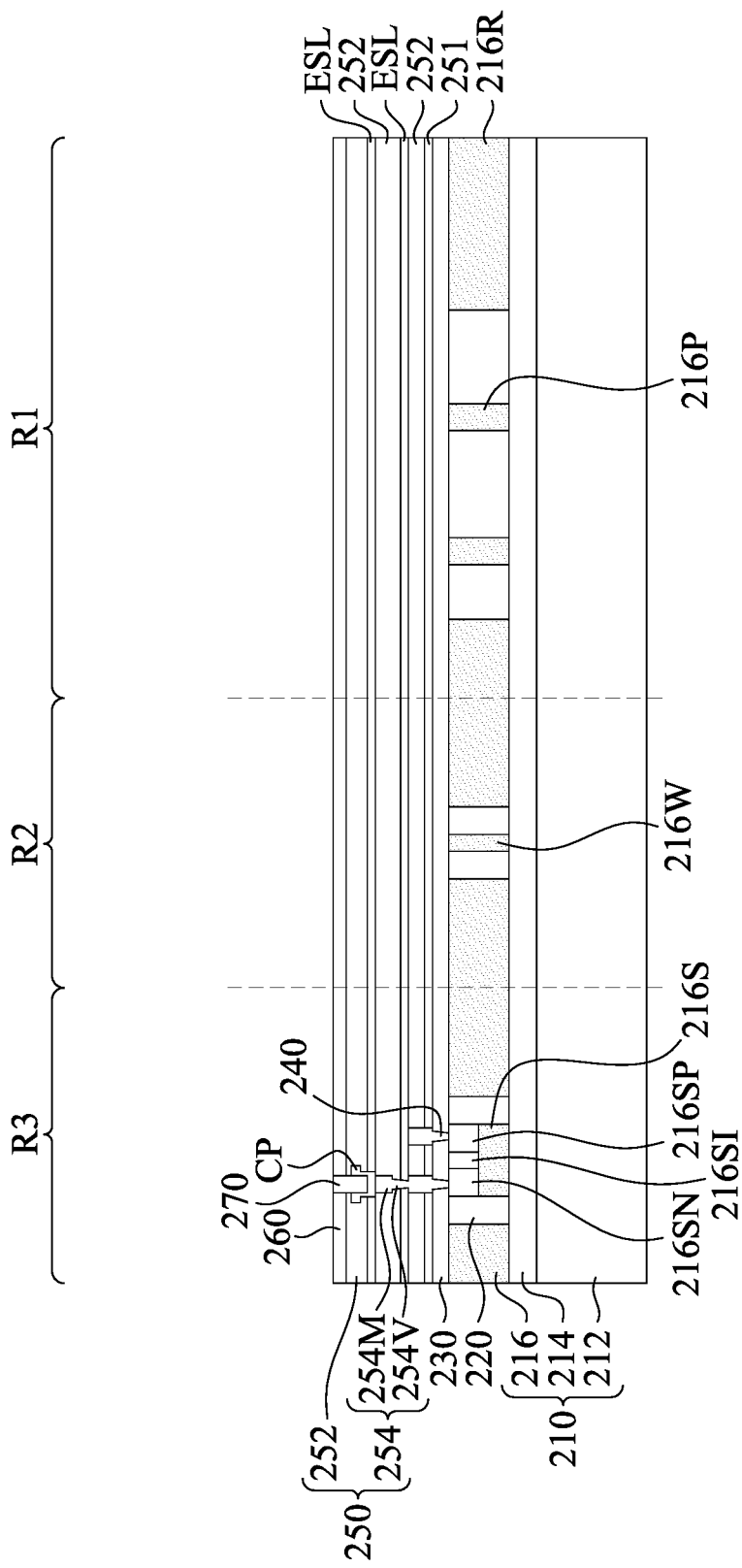

Reference is made to FIG. 6. A metal-dielectric stack (interchangeably referred to as multi-level interconnect structure) 250 is formed over the substantially flat top surface of the structure of FIG. 5 in a back-end-of-line (BEOL) process. In some embodiments, the metal-dielectric stack 250 includes plural ILD layers 252 and a metallization pattern 254 (e.g., plural metal layers 254M and plural metal vias 254V) embedded in the ILD layers 252. The metallization pattern 254 may be connected with the conductive contacts 240. In some embodiments, the ILD layers 252 may include an oxide (e.g., $SiO_2$), an ultra-low k dielectric material, a low-k dielectric material (e.g., SiCO), or the like. The ILD layers 252 may include un-doped silicate glass (USG), hard black diamond (HBD), fluorosilicate glass (FSG), or the like. The metal layers 254M and the metal vias 254V are in the ILD layers 252, in which each of the metal vias 254V is connected between the two adjacent metal layers 254M. In some embodiments, the metal layers 254M and the metal vias 254V may include suitable metallic material such as aluminum, aluminum alloy, copper, copper alloy, titanium, titanium nitride, tantalum, tantalum nitride, tungsten, the like, and/or combinations thereof. Formation of the metal-dielectric stack 250 may be a dual-damascene process and/or a single-damascene process. Although the exemplary embodiments described herein depict six metal layers and five metal vias, this is merely illustrative and it should be understood that the photonic package device may alternatively be formed with more or fewer metal layers and metal vias, depending on the application.

In some embodiments, etch stop layers ESL may be formed between two adjacent ILD layers 252 for protecting the underlying material from being etched when etching trenches or vias for the formation of the metal layers 254M and the metal vias 254V. The etch stop layers ESL may include suitable material other than that of the ILD layers 252. For example, the etch stop layers ESL may include silicon carbide, silicon nitride, silicon oxynitride, the combination thereof, or the like.

In some embodiments, prior to the formation of the metal-dielectric stack 250, the semiconductor structure 216S may be processed to have a PIN diode structure PD, serving as the photodetector 170 in the photonic package device 100 in FIG. 1. For example, in illustrated embodiments, the structure 216S may be doped to have a first doped region 216SN and a second doped region 216SP and have an intrinsic semiconductor feature 216SI disposed between the first doped region 216SN and the second doped region 216SP. The first doped region 216SN has a first conductive type (e.g., n-type) opposite to a second conductive type (e.g., p-type) of the second doped region 216SP. For example, the n-type dopants may include phosphorous, arsenic, antimony, or the like. For example, the p-type dopants may include boron, gallium, indium, or the like. The intrinsic semiconductor feature 216SI may not be intentionally doped, for example, not having intentionally diffused dopants. For example, the intrinsic semiconductor feature 216SI is not intentional doped (NID) semiconductor layers and thus free from the dopants in the doped regions 216SN and 216SP. In some other embodiments, the intrinsic semiconductor feature 216SI may be unintentionally doped due to processes, and has a p-type or an n-type doping concentration lower than that of the doped regions 216SN and 216SP. In some embodiments, a portion of the structure 216S may serve as the intrinsic semiconductor feature 216SI, and the intrinsic semiconductor feature 216SI may have a same semiconductor material (e.g., silicon) as that of the semiconductor layer 216. In some alternative embodiments, a recess may be etched in the structure 216S, and the intrinsic semiconductor feature 216SI may be epitaxially grown in the recess of the structure 216S. The intrinsic semiconductor feature 420 may include semiconductor materials, such as silicon, germanium (Ge), silicon germanium (SiGe), or other semiconductor material can be grown to form the intrinsic semiconductor feature 216SI by suitable epitaxy process.

After the formation of the PIN diode structure PD, a dielectric layer 230 is deposited over the semiconductor layer 216. The dielectric layer 230 may cover the semiconductor structures 216S, 216W, the peripheral structure 216R, and the semiconductor pillars 216P. In some embodiments, the dielectric layer 230 may include an oxide (e.g., $SiO_2$), an ultra-low k dielectric material, a low-k dielectric material (e.g., SiCO), SiON, or the like. In some embodiments, a refractive index of the material of the semiconductor layer 216 is higher than a refractive index of the material of the dielectric layer 230. In some embodiments, the materials of the dielectric layers 220 and 230 may have the same or similar refractive indices. In some embodiments, the dielectric layers 220 and 230 may have the same or similar materials. In some embodiments, the dielectric layer 230 may be formed by chemical vapor deposition (CVD) process, flowable CVD process, atomic layer deposition (ALD), or other suitable process, or the combination thereof.

Due to the difference in refractive indices of the materials of the semiconductor layer 216 and dielectric layers 220 and 230, the structure 216W have high internal reflections such that light is confined in the structure 216W, depending on the wavelength of the light and the reflective indices of the respective materials. Through the configuration, the structure 216W may have a strong optical confinement because it is surrounded by the insulator layer 214 and a low-index material (e.g., the materials of the dielectric layers 220 and 230).

Conductive contacts 240 are formed in the dielectric layer 230 to connect the first doped region 216SN and the second doped region 216SP. Formation of the conductive contacts 240 may include etching contact openings to expose the first doped region 216SN and the second doped region 216SP, and fill the contact openings with one or more conductive materials. In some embodiments, the one or more conductive materials may include tungsten (W), aluminum (Al), titanium (Ti), titanium nitride (TiN), and/or tantalum nitride (TaN). In some embodiments, a diffusion barrier layer and/or a liner layer may be deposited into the contact openings prior to depositing the one or more conductive materials.

Subsequently, an etch stop layer 251 may be formed over the dielectric layer 230 and the conductive contacts 240. The etch stop layer 251 may include suitable material other than that of the ILD layers 252 and the dielectric layer 230. For example, the etch stop layer 251 may include silicon carbide, silicon nitride, silicon oxynitride, the combination thereof, or the like. In some embodiments, the metal-dielectric stack 250 is then formed over the etch stop layer 251. The metallization pattern 254 in the metal-dielectric stack 250 can extend through the etch stop layer 251 and be electrically connected to the conductive contacts 240.

After the formation of the metal-dielectric stack 250, a passivation layer 260 is formed over the metal-dielectric stack 250. A conductive feature 270 is formed in the passivation layer 260 and the metal-dielectric stack 250 to connect the metallization pattern 254. The conductive feature 270 may include suitable conductive materials, such as aluminum. The conductive feature 270 may be a connector, such as conductive bumps, solder balls, etc. In some embodiments, prior to the formation of the conductive feature 270, a contact pad CP is formed over the metallization pattern 254. The contact pad CP may include suitable conductive materials, such as copper, aluminum, the combination thereof, or the like. The conductive feature 270 may be electrically connected to the metallization pattern 254 through the contact pad CP. Through the conductive feature 270, electrical components (not shown), such as dies, may be electrically connected to the metallization pattern 254.

Figure 7:
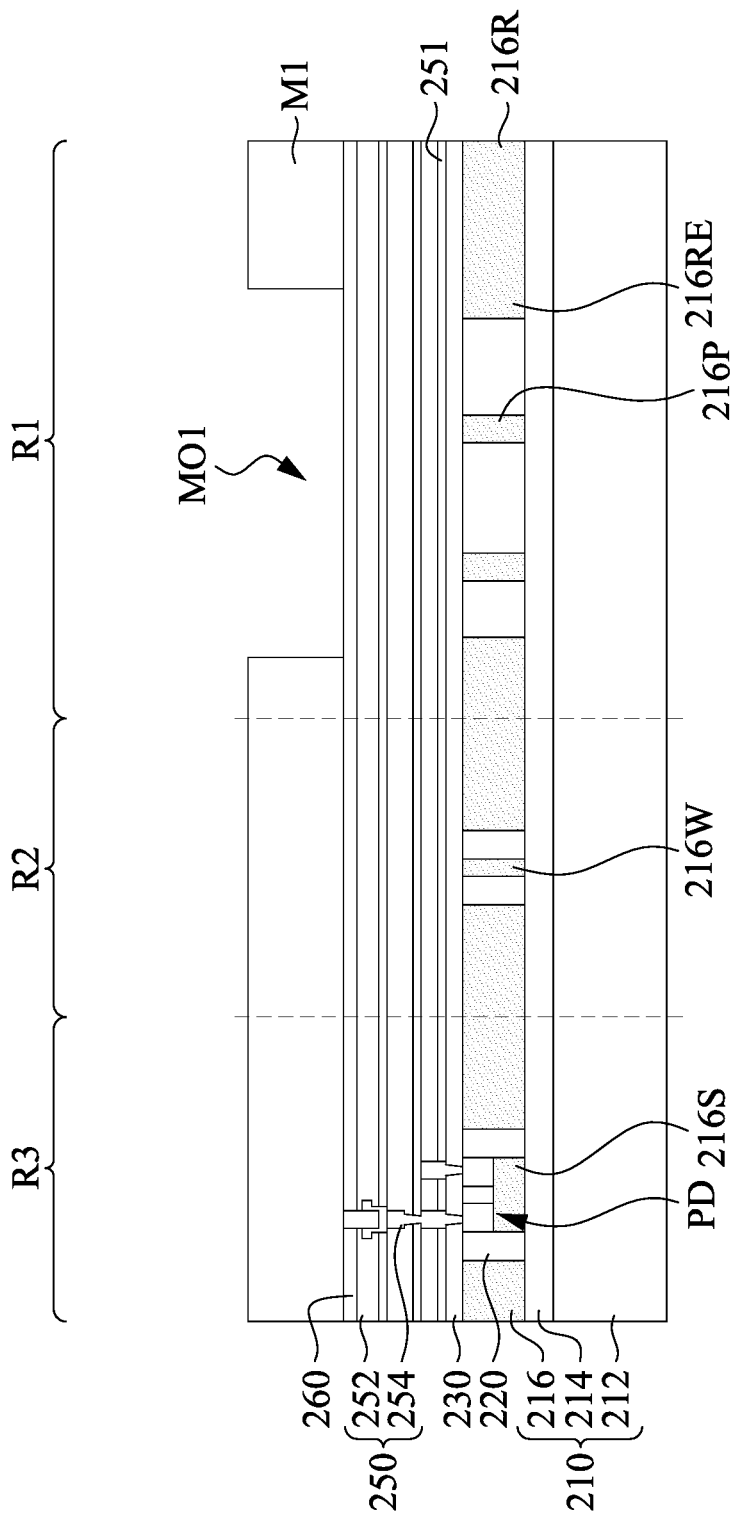

Reference is made to FIG. 7. A photoresist mask M1 is formed over the structure of FIG. 6 and have openings MO1

(or trenches) therein. The photoresist mask M1 may include a photosensitive material. The photoresist mask M1 may be formed by suitable photolithography process. The photolithography process may include coating a photoresist layer (not shown), exposing the photoresist to a pattern, performing post-exposure bake processes, and developing the resist to form a patterned mask including the resist. In some alternative embodiments, the photoresist mask M1 may be a tri-layer photoresist. For example, the photoresist mask 190 includes a bottom layer, a middle layer over the bottom layer, and a photoresist layer over the middle layer. The bottom layer may include organic or inorganic material. The middle layer may include silicon nitride, silicon oxynitride, SiOC, or the like. The photoresist layer may include a photosensitive material.

Figure 8A:
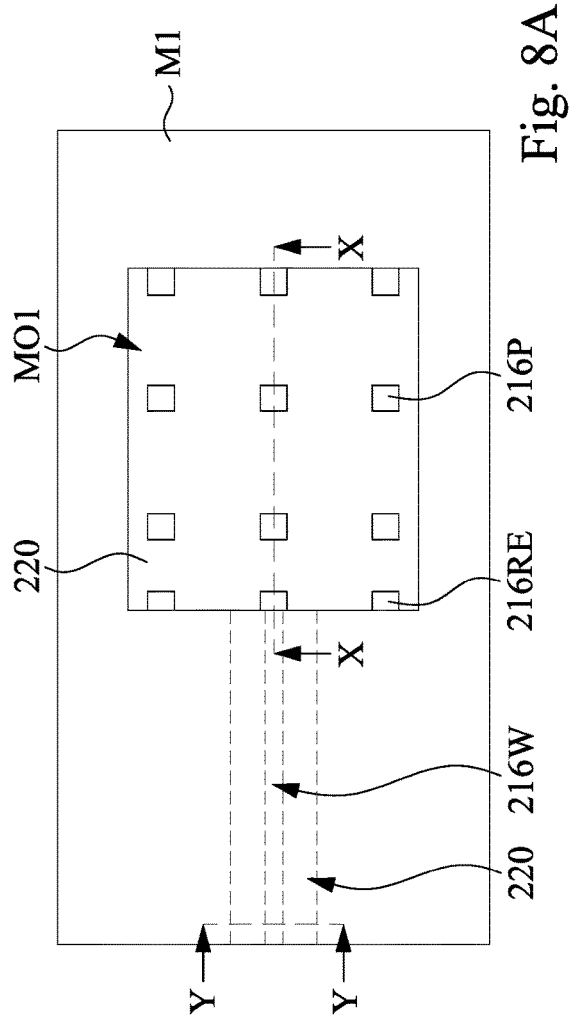
Figure 8B:
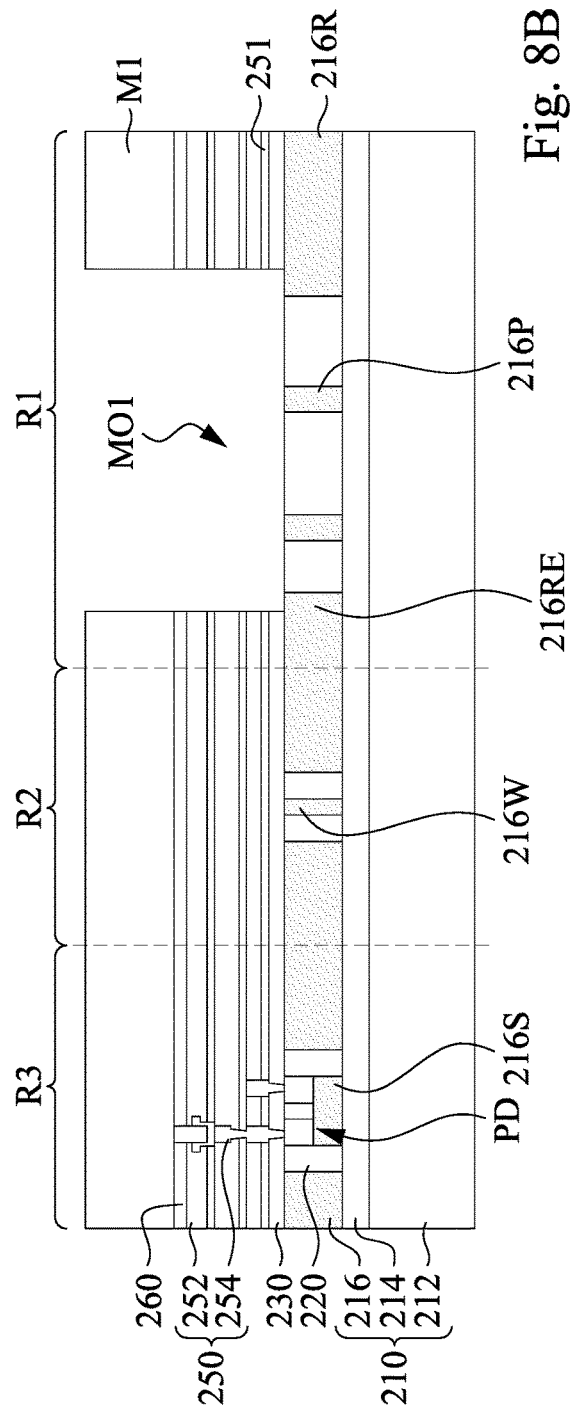

Reference is made to FIGS. 8A and 8B. FIG. 8A shows a schematic top view of the photonic package device. FIG. 8B is a schematic cross-sectional view of the photonic package device including the cross-sectional views taken along line X-X and Y-Y of FIG. 8A (respectively corresponding to the regions R1 and R2). The opening MO1 in the photoresist mask M1 is extended through the passivation layer 260, the metal-dielectric stack 250, the etch stop layer 251, and the dielectric layer 230 using, for example, plural etching processes. In some embodiments, after the etching processes, the opening MO1 expose the semiconductor pillars 216P and the edge portions 216RE of the semiconductor layer 216 (e.g., semiconductor wall pillars) and some portions of the dielectric layer 220.

Figure 9A:
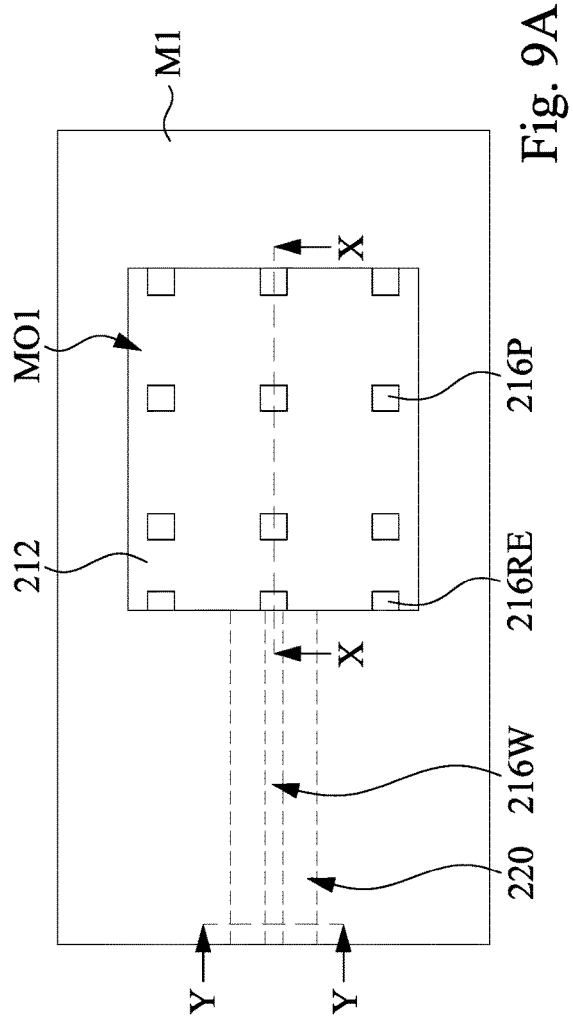
Figure 9B:
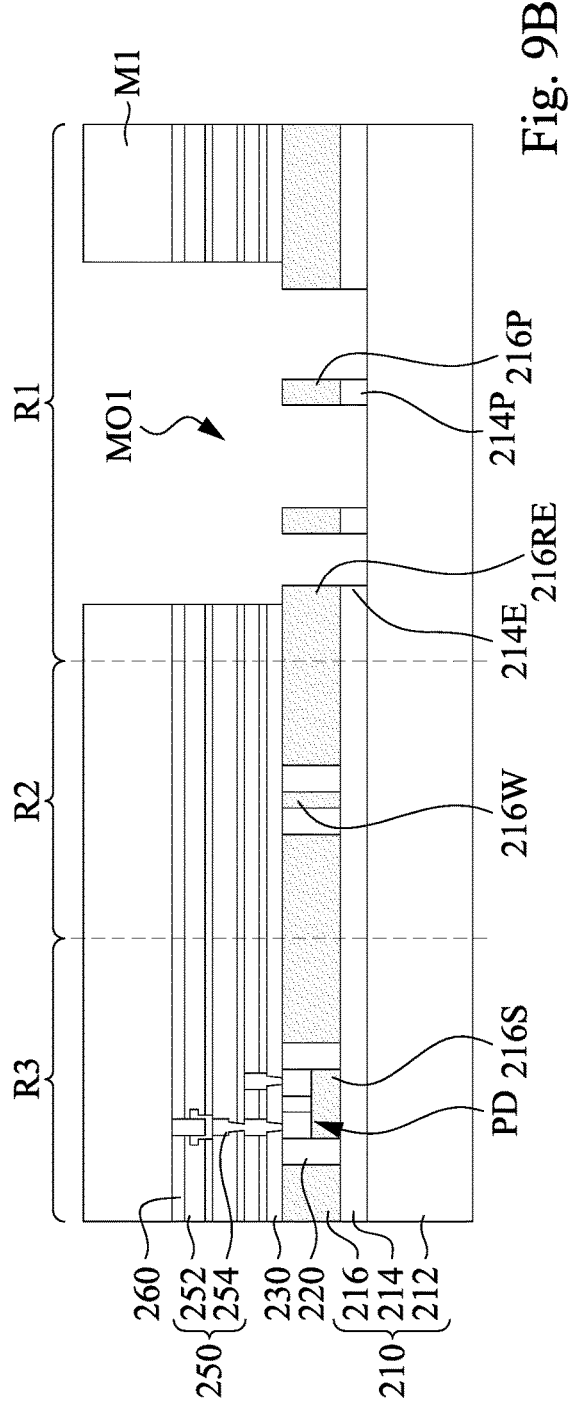

Reference is made to FIGS. 9A and 9B. FIG. 9A shows a schematic top view of the photonic package device. FIG. 9B is a schematic cross-sectional view of the photonic package device including the cross-sectional views taken along line X-X and Y-Y of FIG. 9A (respectively corresponding to the regions R1 and R2). A first selective etching process is performed to remove the portions of the dielectric layer 220 exposed by the opening MO1. The semiconductor pillars 216P and the edge portions 216RE may have a higher etch resistance to the first selective etching process than that of the dielectric layer 220, and therefore not be substantially removed by the first selective etching process. Stated differently, during the first selective etching process, an etch rate to the dielectric layer 220 (e.g., silicon oxide) is greater than an etch rate to the semiconductor pillars 216P and the edge portions 216RE (e.g., silicon). In some embodiments, the first selective etching process may have an etch selectivity between silicon oxides to silicon greater than 10, in which the etch selectivity may be referred to as a ratio of the etch rate to silicon oxide to the etch rate to silicon. The first selective etching process may also remove portions of the insulator layer 214 (e.g., silicon oxide) underneath the opening MO1 and uncovered by the semiconductor pillars 216P and the edge portions 216RE. The semiconductor pillars 216P and the edge portions 216RE may serve as etch masks that protect portions of the insulator layer 214 from being etched during the first selective etching process. After the first selective etching process, remaining portions of the insulator layer 214 below the semiconductor pillars 216P are referred to as insulator caps 214P, and remaining portions of the insulator layer 214 below the edge portions 216RE are referred to as insulator caps 214E.

Figure 10A:
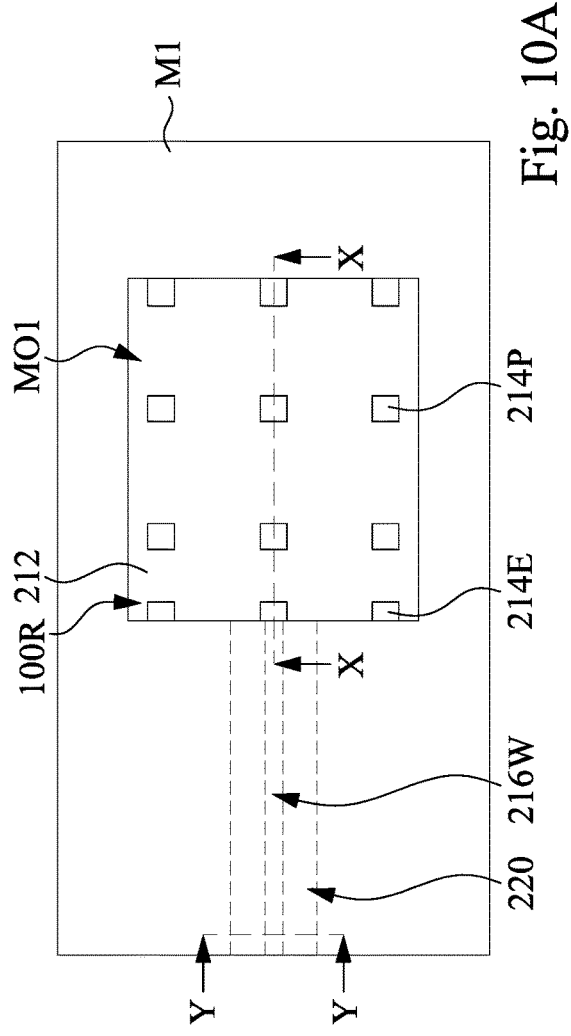
Figure 10B:
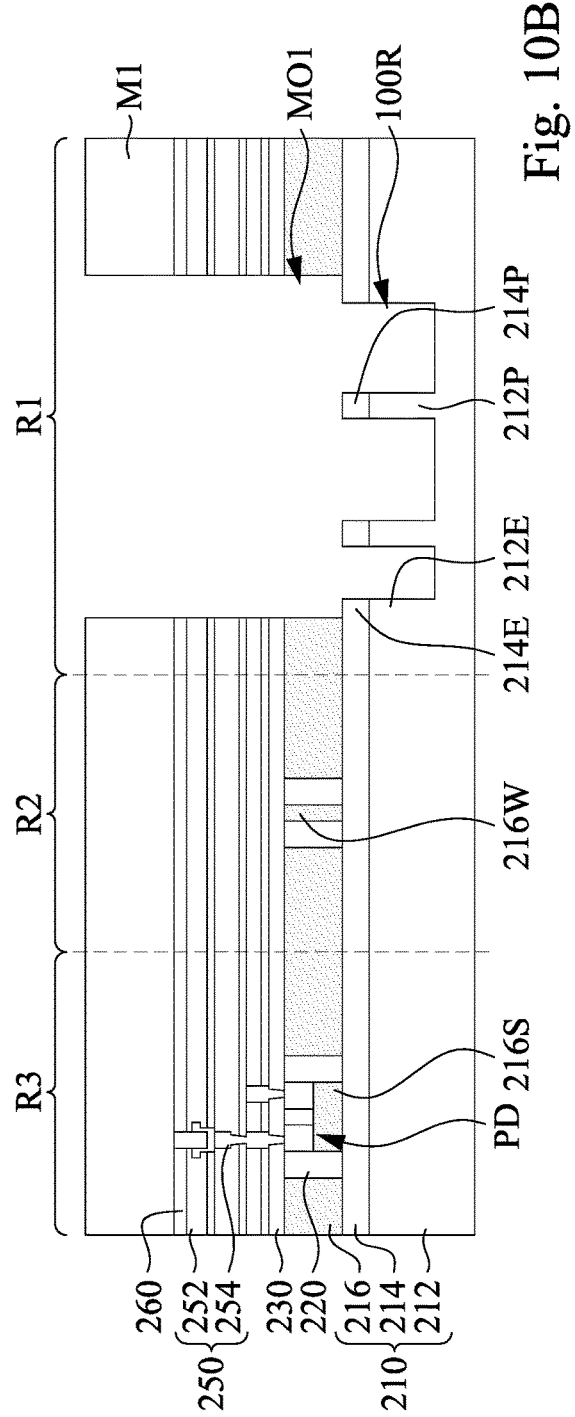

Reference is made to FIGS. 10A and 10B. FIG. 10A shows a schematic top view of the photonic package device. FIG. 10B is a schematic cross-sectional view of the photonic package device including the cross-sectional views taken along line X-X and Y-Y of FIG. 10A (respectively corresponding to the regions R1 and R2). A second selective etching process is performed to remove portions of the substrate 212 (e.g., silicon) underneath the opening MO1 and uncovered by the insulator caps 214P and 214E. The semiconductor pillars 216P and the edge portions 216RE (referring to FIGS. 9A and 9B) may be consumed during the second selective etching process, thereby exposing top surfaces of the insulator caps 214P and 214E after the second selective etching process. The insulator caps 214P and 214E may have a higher etch resistance to the second selective etching process than that of the semiconductor layer 216 and the substrate 212, and therefore not be substantially removed by the second selective etching process. Stated differently, during the second selective etching process, an etch rate to the semiconductor layer 216 and the substrate 212 (e.g., silicon) is greater than an etch rate to the insulator caps 214P and 214E (e.g., silicon oxide). In some embodiments, the second selective etching process may have an etch selectivity between silicon and silicon oxides greater than 10, in which the etch selectivity can be referred to as a ratio of the etch rate to silicon to the etch rate to silicon oxides. The insulator caps 214P and 214E may serve as etch masks that protect portions of the substrate 212 from being etched during the second selective etching process. After the second selective etching process, remaining portions of the substrate 212 below the insulator caps 214P are referred to as semiconductor pillars 212P, and remaining portions of the substrate 212 below the insulator caps 214E are referred to as edge portions 212E. In the present embodiments, as the configuration of the edge portion 216RE shown in FIG. 3A, the edge portions 212E of the substrate 212 are illustrated as semiconductor wall pillars that protrudes from an edge of the opening MO1 from the top view. In some other embodiments, the edge portions 212E of the substrate 212 may have other suitable configuration.

Through the first and second etching processes, a recess 100R is formed in the photonic package device 100. The pillars 100CP are disposed in the recess 100R, and the edge supporting structures 100CE are disposed around the recess 100R. Each of the pillars 100CP may include a semiconductor pillar 212P and an insulator cap 214P over the pillar 212P, and each of the edge supporting structures 100CE may include a semiconductor edge portion 212E and an insulator cap 214E over the edge portion 212E. After the first and second selective etching processes, the photoresist mask M1 may be stripped off by suitable ashing process.

Figure 11A:
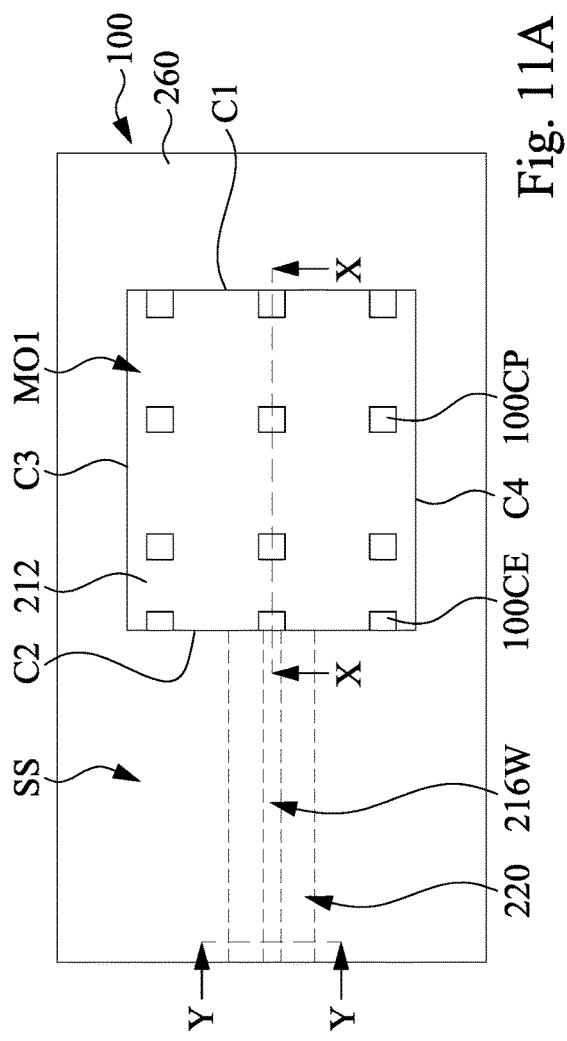
Figure 11B:
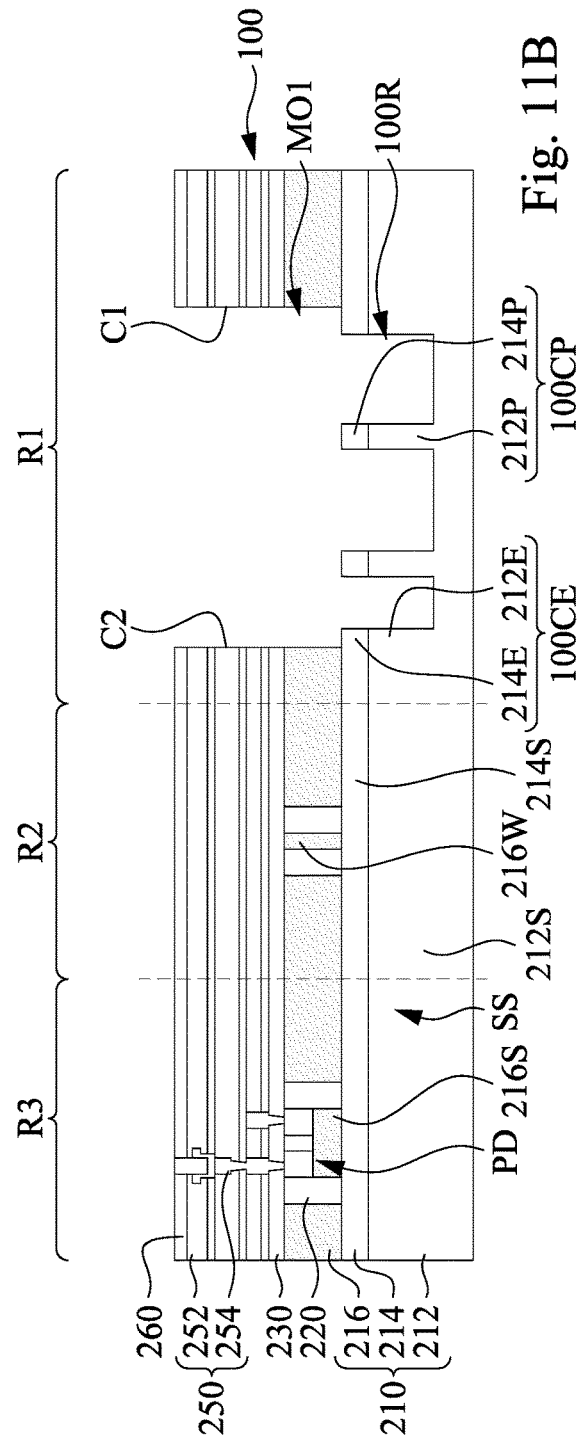

The resulted package structure is shown in FIGS. 11A and 11B. FIG. 11A shows a schematic top view of the photonic package device. FIG. 11B is a schematic cross-sectional view of the photonic package device including the cross-sectional views taken along line X-X and Y-Y of FIG. 11A (respectively corresponding to the regions R1 and R2). Through the illustrated fabrication process, the photonic package device 100 may have a cavity (e.g., the opening MO1) for receiving an optical component, such as laser diode. The photonic package device 100 may have the semiconductor pillars 100CP and the edge supporting structures 100CE for supporting the optical component. In the present embodiments, the edge supporting structures 100CE are disposed at two opposite sides C1 and C2 of the cavity (e.g., the opening MO1), and the other two opposite sides C3 and C4 of the cavity (e.g., the opening MO1) are free of the edge supporting structures 100CE. The edge supporting structures 100CE may have other suitable configuration in some other embodiments, some of which are illustrated later. The photonic package device 100 may have the structure 216W acting as the waveguide WG and the optical couplers 120 and 140 in FIG. 1, and the PIN diode structure PD acting as the photodetector 170 in FIG. 1.

In some embodiments, the substrate 212 may have a semiconductor structure SS surrounding the semiconductor pillars 212P. The semiconductor structure SS may have a sidewall facing the semiconductor pillars 212P. In some embodiments, the semiconductor structure SS includes a supporting portion 212S and an edge portion 212E. The supporting portion 212S may be covered by the semiconductor layer 216 (e.g., the semiconductor structure 216W) and the metal-dielectric stack 250. The edge portion 212E may be free from covered by the semiconductor layer 216 (e.g., the semiconductor structure 216W) and the metal-dielectric stack 250. The edge portion 212E may be a semiconductor pillar, a continuous semiconductor bar, a semiconductor ring, the like, or the combination thereof. In present embodiments, two edge portions 212E may be disposed at opposite sides of the semiconductor pillars 212P. In some other embodiments, as illustrated later with FIGS. 15A and 15B, the edge portion 212E may encircle the semiconductor pillars 212P from a top view. The insulator layer 214 may have a first portion 214S between the supporting portion 212S and the semiconductor layer 216 (e.g., the semiconductor structure 216W) and a second portion (e.g., insulator caps 214E) over the edge portion 212E.

In some cases, after the formation of the waveguide structure, the cavity for receiving the optical component is etch first, and then the pillars underneath the cavity are fabricated. Photoresist coating on the cavity with a high topography may induce poor coating issue (e.g., pillar missing problem), non-uniform photoresist thickness (e.g., poor critical dimension uniformity (CDU) uniformity, focusing and photoresist scum problem), and corner damage issue at edge of the cavity. Besides, the formation of the cavity and the pillars may take many photomasks.

In some embodiments of the present disclosure, the pattern of the pillars is defined along with the formation of the waveguide structure, thereby saving the number of photomasks. A CMP process (e.g., to the waveguide structure, referring to FIG. 5) is performed after the formation of the pillar pattern, and thus a photomask used for etching the cavity can be formed over a substantially flat surface above the pillar pattern, thereby addressing the poor coating issue and corner damage issue. That is, being formed after the CMP process, the photomask can be formed with good corner edge protection and good coating uniformity. The photomask may also be used for selectively etching materials underneath the cavity to uncover the pillars.

FIG. 12A shows a schematic top view illustrating placing a light source device in the photonic package device 100 of FIG. 11A. FIG. 12B is a schematic cross-sectional view of the photonic package device including the cross-sectional views taken along line X-X and Y-Y of FIG. 12A (respectively corresponding to the regions R1 and R2). In some embodiments, the photonic package device 100 shown in FIGS. 11A and 11B may be further processed with a light source device 300 bonded thereon. The light source device 300 may act as the optical source 110 in FIG. 1. The light source device 300 is placed in the cavity (e.g., the opening MO1) in the photonic package device 100. The bottom surface of the light source device 300 may be substantially in plane with the top surfaces of the pillars 100CP and the edge supporting structures 100CE, and therefore being structurally supported. The light source device 300 can be bonded to the substrate, for example using surface mounting techniques.

The light source device 300 may be configured to provide unmodulated lights, such as unmodulated lasers. Light produced by the laser(s) can be distributed across the computing system and can serve as reference light to be modulated with data. The laser(s) of the light source device 300 can be coupled to the semiconductor substrate using couplers (e.g., the structure 216W in FIG. 12A). In some embodiments, laser light is emitted in a direction parallel to the chip surface can be directed towards the couplers (e.g., the structure 216W in FIG. 12A). The light source device 300 may have an active layer 310 for creating and emitting the laser light. The light source device 300 may be a laser diode. For example, the light source device 300 may include III-V lasers, such as InP-based lasers or GaAs-based lasers. In the present embodiments, the laser diode is an edge-emitting laser. For example, the light source device 300 may have an edge emitting surface 300S, which can be a surface of the active layer 310 facing the coupler (e.g., the structure 216W) in the present embodiments. In some embodiments, the edge emitting surface 300S is in contact with the side C2 of the cavity (e.g., the opening MO1), and thus can be in contact with the coupler (e.g., the structure 216W). In some alternative embodiments, the edge emitting surface 300S may be spaced apart from the side C1 of the cavity (e.g., the opening MO1), and thus can be spaced apart from the coupler (e.g., the structure 216W).

In some embodiments, prior to placing the light source device 300 in the cavity (e.g., the opening MO1), a circuitry 900 may be formed in recess 100R by deposition, photolithography, etching processes, and other suitable process. Connectors 320, which may be, for example, conductive pads, conductive pillars, or the like, may be formed over the circuitry 900 by deposition, photolithography, etching processes, and other suitable process. The light source device 300 can be powered via the circuitry 900.

In some embodiments of the present embodiments, the pillars 100CP and the edge supporting structures 100CE are designed with a suitable height through the illustrated fabrication processes. For example, the pillars 100CP and the edge supporting structures 100CE has top surfaces substantially in plane with a top surface of the structure 216W (e.g., couplers or waveguides). Through the configuration, the light source device 300 placed over the pillars 100CP and the edge supporting structures 100CE can be aligned with respect to the structure 216W (e.g., couplers or waveguides). That is, the pillars 100CP and the edge supporting structures 100CE can provide vertical alignment between the light source device 300 and the structure 216W, thereby enhancing the coupling efficiency therebetween. In some embodiments, the vertical alignment is provided such that a vertical center point/plane of the active layer 310 is lower than a top surface of the structure 216W and higher than a bottom surface of the structure 216W. In some examples, a vertical center point/plane of the active layer 310 of the light source device 300 is substantially horizontally aligned with a vertical center point/plane of the structure 216W, as indicated by a dashed horizontal line DL in the figure.

After placing the light source device 300 in the cavity (e.g., the opening MO1) with the fine vertical alignment, the photonic package device 100 and the light source device 300 may be subjected to a thermal treatment and/or pressed against each other (e.g., by applying contact pressure) to bond the photonic package device 100 and the light source device 300. The photonic package device 100 and the light source device 300 may be subjected to a temperature at or above the eutectic point of the material of the conductive pads (not shown) and the connectors 320 to fuse the conductive pads (not shown) and the die connectors 320. In this manner, the dielectric-to-dielectric bonding and/or metal-to-metal bonding of photonic package device 100 and the light source device 300 forms a bonded structure. In some embodiments, the bonded structure is baked, annealed, pressed, or otherwise treated to strengthen or finalize the bonds.

In the present embodiments, a first edge of the light source device 300 having the edge emitting surface 300S is supported by the edge supporting structures 100CE, and a second edge of the light source device 300 opposite to the first edge is supported by the edge supporting structures 100CE, while the other two opposite edges of the light source device 300 are free of being supported by the edge supporting structures 100CE. In some other embodiments, the light source device 300 and the edge supporting structures 100CE may have other configurations, which are illustrated later.

Figure 13B:
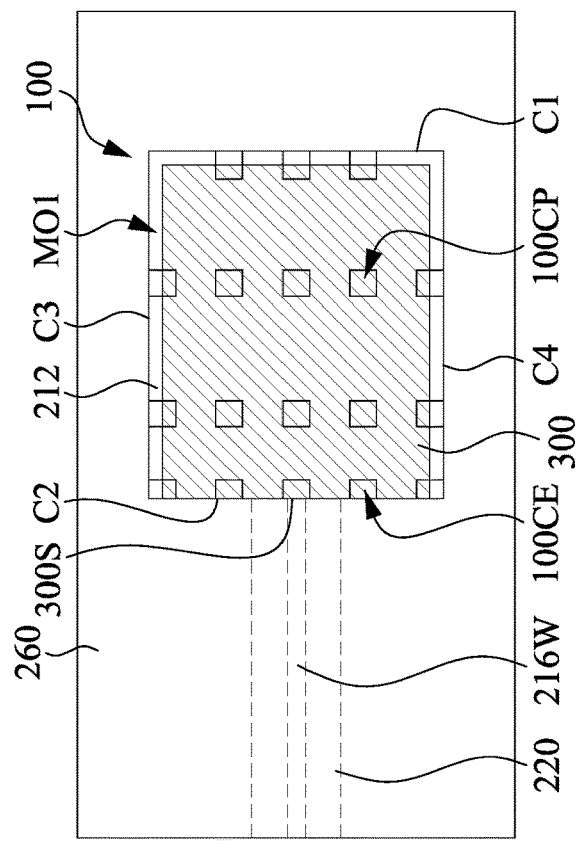
FIGS. 13A and 13B illustrate schematic top and cross-sectional views of a photonic package device according to some embodiments of the present disclosure.
Figure 13A:
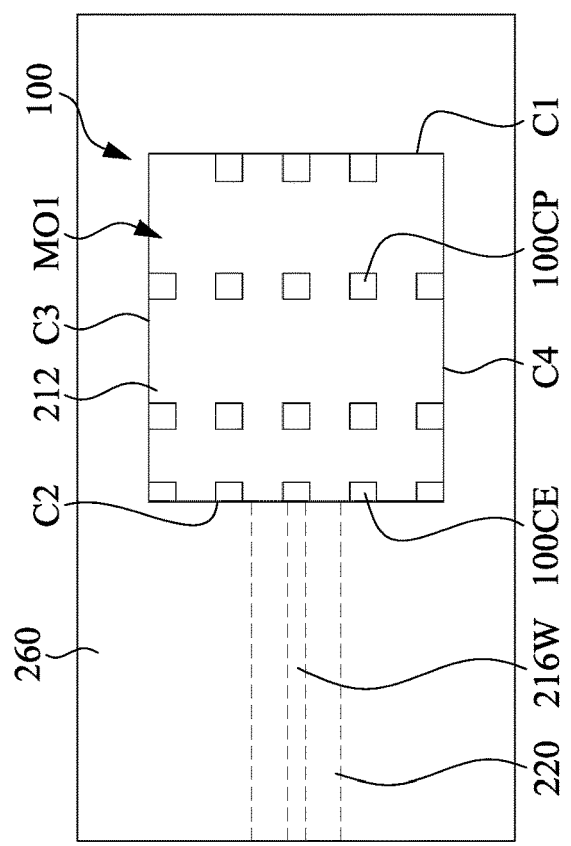

FIGS. 13A and 13B illustrate schematic top and cross-sectional views of a photonic package device according to some embodiments of the present disclosure. The present embodiments are similar to that of FIGS. 12A and 12B, except that the edge supporting structures 100CE are disposed at the four sides C1-C4 of the cavity (e.g., the opening MO1). After placing the light source device 300 into the cavity (e.g., the opening MO1), the four edges of the light source device 300 can be supported by the edge supporting structures 100CE. Other details of the present embodiments are similar to those illustrated in the embodiments of FIGS. 2-12B, and therefore not repeated herein.

Figure 14B:
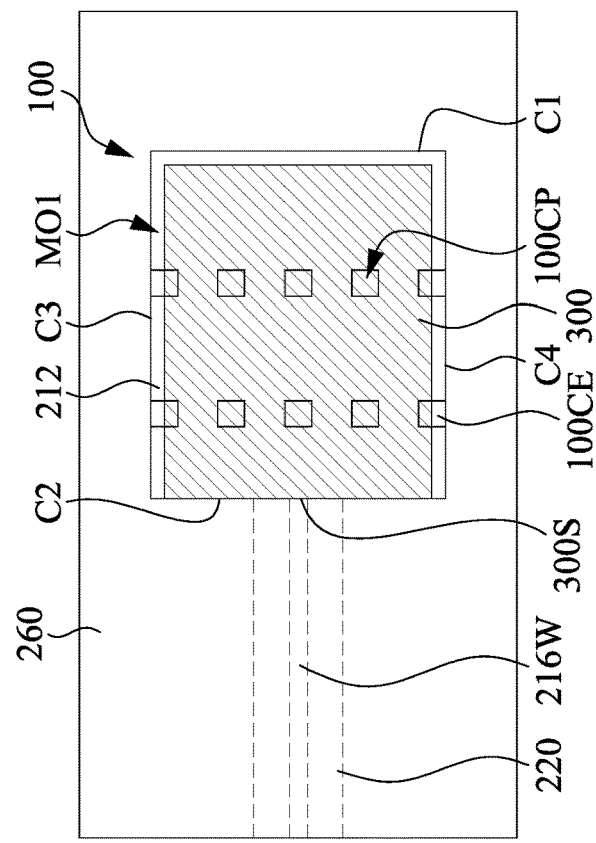
FIGS. 14A and 14B illustrate schematic top and cross-sectional views of a photonic package device according to some embodiments of the present disclosure.
Figure 14A:
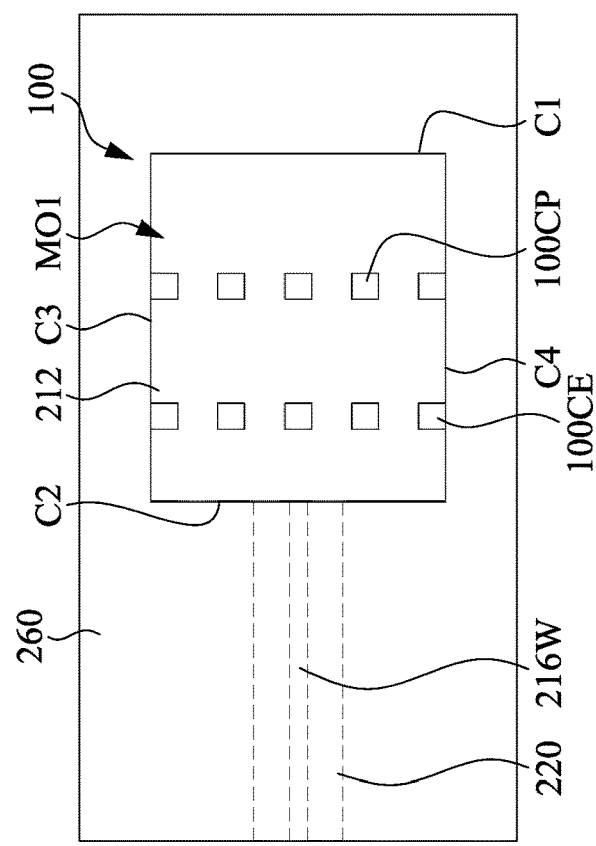

FIGS. 14A and 14B illustrate schematic top and cross-sectional views of a photonic package device according to some embodiments of the present disclosure. The present embodiments are similar to that of FIGS. 12A and 12B, except that the edge supporting structures 100CE are disposed at the two opposite sides C3 and C4 of the cavity (e.g., the opening MO1), and the two opposite sides C1 and C2 of the cavity (e.g., the opening MO1) are free of the edge supporting structures 100CE. After placing the light source device 300 into the cavity (e.g., the opening MO1), a first edge of the light source device 300 having the edge emitting surface 300S is free of being supported by the edge supporting structures 100CE, and a second edge of the light source device 300 opposite to the first edge is free of being supported by the edge supporting structures 100CE, while the other two opposite edges of the light source device 300 are supported by the edge supporting structures 100CE. Other details of the present embodiments are similar to those illustrated in the embodiments of FIGS. 2-12B, and therefore not repeated herein.

Figure 15B:
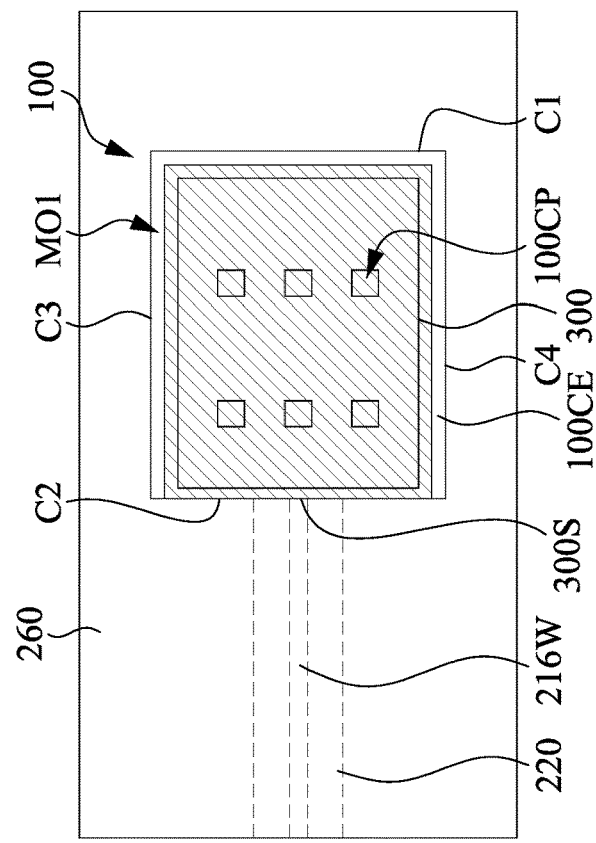
FIGS. 15A and 15B illustrate schematic top and cross-sectional views of a photonic package device according to some embodiments of the present disclosure.
Figure 15A:
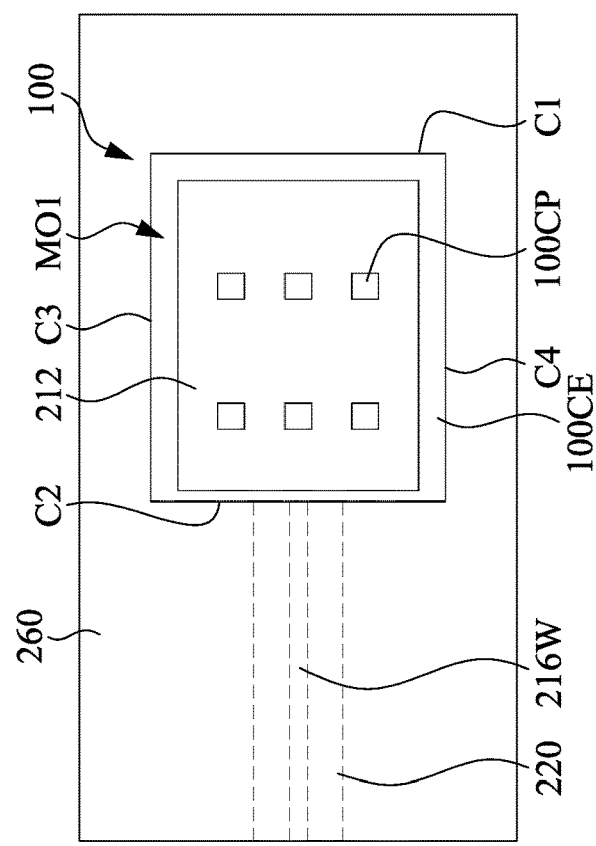

FIGS. 15A and 15B illustrate schematic top and cross-sectional views of a photonic package device according to some embodiments of the present disclosure. The present embodiments are similar to that of FIGS. 12A and 12B, except that the edge supporting structure 100CE is a continuous ring disposed at the four sides C1-C4 of the cavity 100C. The edge supporting structure 100CE may form a closed loop from the top view. For example, the edge supporting structure 100CE encircles the semiconductor pillars 100CP from the top view. After placing the light source device 300 into the cavity 100C, the four edges of the light source device 300 can be supported by the closed-loop edge supporting structure 100CE. In some alternative embodiments, in the top view, the edge supporting structure 100CE may further include wall pillars at the inner sides of the ring. Other details of the present embodiments are similar to those illustrated in the embodiments of FIGS. 2-12B, and therefore not repeated herein.

Figure 16B:
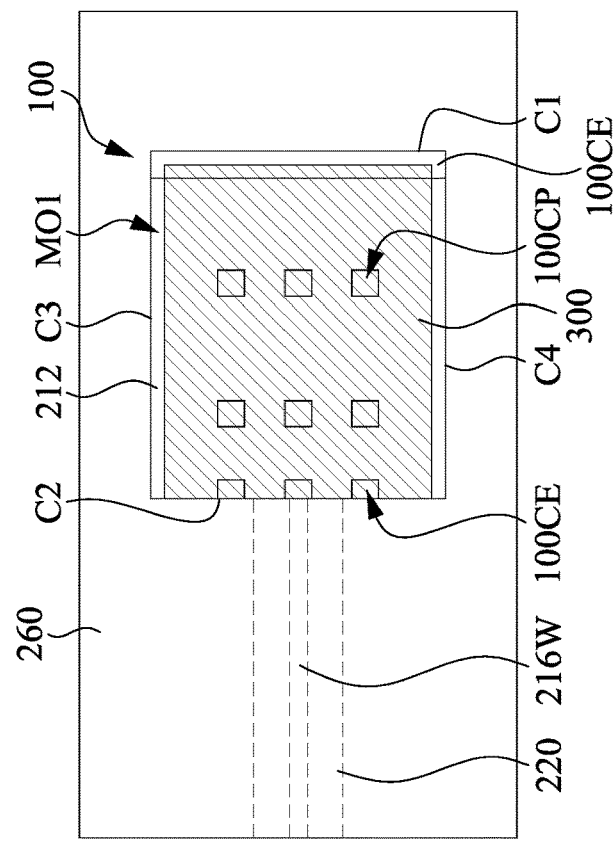
FIGS. 16A and 16B illustrate schematic top and cross-sectional views of a photonic package device according to some embodiments of the present disclosure.
Figure 16A:
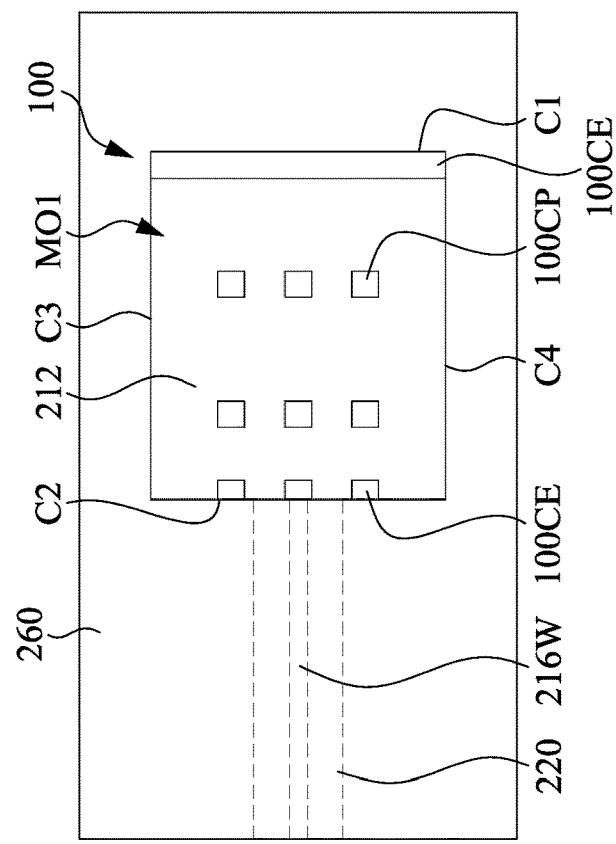

FIGS. 16A and 16B illustrate schematic top and cross-sectional views of a photonic package device according to some embodiments of the present disclosure. The present embodiments are similar to that of FIGS. 12A and 12B, except that the edge supporting structure 100CE may be a continuous bar disposed at one or more sides C1-C4 of the cavity (e.g., the opening MO1). For example, in the present embodiments, one of the edge supporting structures 100CE is illustrated a continuous bar at the side C1 of the cavity (e.g., the opening MO1). After placing the light source device 300 into the cavity (e.g., the opening MO1), an edge of the light source device 300 can be fully supported by the edge supporting structure 100CE. In some alternative embodiments, in the top view, the edge supporting structure 100CE may further include wall pillars at the inner side of the bar. Other details of the present embodiments are similar to those illustrated in the embodiments of FIGS. 2-12B, and therefore not repeated herein.

Based on the above discussions, it can be seen that the present disclosure offers advantages to the photonic package device. It is understood, however, that other embodiments may offer additional advantages, and not all advantages are necessarily disclosed herein, and that no particular advantage is required for all embodiments. One advantage is that a CMP process is performed after the formation of the pillar pattern, and thus a photomask used for etching the cavity can be formed over a substantially flat surface above the pillar pattern, thereby addressing the poor coating issue and corner damage issue, which in turn will result in the uniform pillar size and height and the sharp profile of embedding hole. Stated differently, being formed after the CMP process, the photomask used for etching the cavity can be formed with good corner edge protection and good coating uniformity, and a reliable process for pillar formation is achieved. The photomask may also be used for selectively etching materials underneath the cavity to expose the pillars. Another advantage is that the pattern of the pillars is defined along with the formation of the waveguide structure, thereby saving the number of photomasks. Still another advantage is that three-steps etching process is used to transfer the pattern of the pillars at top silicon to the base substrate (e.g., handle wafer).

According to some embodiments of the present disclosure, a method for fabricating a photonic package device is provided. The method includes patterning a semiconductor layer of a semiconductor-on-insulator (SOI) substrate into a waveguide structure and at least one first semiconductor pillar; forming a metal-dielectric stack over the waveguide structure and the first semiconductor pillar; etching an opening in the metal-dielectric stack to expose the first semiconductor pillar; etching an insulator layer of the SOI substrate to form at least one insulator cap below the first semiconductor pillar; and etching a base semiconductor substrate of the SOI substrate to form at least one second semiconductor pillar below the insulator cap.

According to some embodiments of the present disclosure, a method for fabricating a photonic package device is provided. The method includes patterning a semiconductor layer of a semiconductor-on-insulator (SOI) substrate into a waveguide structure and a peripheral structure, wherein the peripheral structure has a first opening and an edge portion adjacent the first opening; filling the first opening of the peripheral structure with a dielectric layer; forming a metal-dielectric stack over the waveguide structure, the peripheral structure, and the dielectric layer; etching a second opening in the metal-dielectric stack to expose the edge portion of the peripheral structure; and etching an insulator layer and a base substrate of the SOI substrate through the second opening to form a recess in the SOI substrate and an edge supporting structure surrounding the recess.

According to some embodiments of the present disclosure, a photonic package device includes a semiconductor substrate, a waveguide structure, a metal-dielectric stack, and a light source device. The semiconductor substrate includes at least one semiconductor pillar and a semiconductor structure surrounding the semiconductor pillar. The waveguide structure is over a first portion of the semiconductor structure of the semiconductor substrate. The metal-dielectric stack is over the waveguide structure, in which the semiconductor pillar and a second portion of the semiconductor structure are free from coverage by the metal-dielectric stack. The light source device is supported by the semiconductor pillar and the second portion of the semiconductor structure.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for fabricating a photonic package device, comprising:
    patterning a semiconductor layer of a semiconductor-on-insulator (SOI) substrate into a waveguide structure and at least one first semiconductor pillar;
    forming a metal-dielectric stack over the waveguide structure and the first semiconductor pillar;
    etching an opening in the metal-dielectric stack to expose the first semiconductor pillar;
    etching an insulator layer of the SOI substrate to form at least one insulator cap below the first semiconductor pillar; and
    etching a base semiconductor substrate of the SOI substrate to form at least one second semiconductor pillar below the insulator cap.

2. The method of claim 1, further comprising:
    forming a patterned mask over the metal-dielectric stack prior to etching the opening in the metal-dielectric stack, wherein etching the opening in the metal-dielectric stack is performed with the patterned mask in place.

3. The method of claim 2, wherein etching the insulator layer is performed with the patterned mask in place.

4. The method of claim 3, wherein etching the base semiconductor substrate is performed with the patterned mask in place.

5. The method of claim 1, wherein etching the base semiconductor substrate is performed such that the first semiconductor pillar is removed to expose a top surface of the insulator cap.

6. The method of claim 1, wherein the patterning the base semiconductor layer is performed such that the semiconductor layer is further patterned into a peripheral structure surrounding the first semiconductor pillar, and etching the opening in the metal-dielectric stack is performed such that the opening further exposes an edge portion of the peripheral structure.

7. The method of claim 1, further comprising:
    bonding a light source device onto the base semiconductor substrate, wherein the light source device is in the opening in the metal-dielectric stack and supported by the insulator cap and the second semiconductor pillar.

8. A method for fabricating a photonic package device, comprising:
    patterning a semiconductor layer of a semiconductor-on-insulator (SOI) substrate into a waveguide structure and a peripheral structure, wherein the peripheral structure has a first opening and an edge portion adjacent the first opening;
    filling the first opening of the peripheral structure with a dielectric layer;
    forming a metal-dielectric stack over the waveguide structure, the peripheral structure, and the dielectric layer;
    etching a second opening in the metal-dielectric stack to expose the edge portion of the peripheral structure; and
    etching an insulator layer and a base substrate of the SOI substrate through the second opening to form a recess in the SOI substrate and an edge supporting structure surrounding the recess.

9. The method of claim 8, further comprising:
    forming a patterned mask over the metal-dielectric stack prior to etching the second opening in the metal-dielectric stack, wherein etching the second opening in the metal-dielectric stack is performed with the patterned mask in place.

10. The method of claim 9, wherein etching the insulator layer and the base substrate is performed with the patterned mask in place.

11. The method of claim 8, wherein etching the insulator layer and the base substrate comprises:
    using the edge portion of the peripheral structure as etch mask, performing a first selective etching process to etch the insulator layer to form an insulator cap of the edge supporting structure; and
    using the insulator cap as etch mask, performing a second selective etching process to etch the base substrate.

12. The method of claim 11, wherein the second selective etching process is performed such that the edge portion of the peripheral structure is removed to expose a top surface of the insulator cap of the edge supporting structure.

13. The method of claim 8, wherein patterning the semiconductor layer is performed such that the edge portion of the peripheral structure comprises a semiconductor wall pillar.

14. The method of claim 8, further comprising:
    bonding a light source device onto the base substrate, wherein the light source device is in the second opening in the metal-dielectric stack and supported by the edge supporting structure.

15. A photonic package device, comprising:
    a semiconductor substrate comprises at least one semiconductor pillar and a semiconductor structure surrounding the semiconductor pillar;
    a waveguide structure over a first portion of the semiconductor structure of the semiconductor substrate;
    a metal-dielectric stack over the waveguide structure, wherein the semiconductor pillar and a second portion of the semiconductor structure are free from coverage by the metal-dielectric stack; and a light source device supported by the semiconductor pillar and the second portion of the semiconductor structure.

16. The photonic package device of claim 15, wherein the semiconductor structure has a sidewall facing the semiconductor pillar.

17. The photonic package device of claim 15, further comprising:
   an insulator cap over the semiconductor pillar; and
   an insulator layer having a first portion between the first portion of the semiconductor structure and the waveguide structure and a second portion over the second portion of the semiconductor structure.

18. The photonic package device of claim 15, wherein the second portion of the semiconductor structure is a semiconductor wall pillar.

19. The photonic package device of claim 15, wherein the semiconductor structure has a third portion free from coverage by the metal-dielectric stack, and the second and third portions of the semiconductor structure are at opposite sides of the semiconductor pillar.

20. The photonic package device of claim 15, wherein the second portion of the semiconductor substrate encircles a plurality of the semiconductor pillars from a top view.

* * * * *